(12) United States Patent
Bishop et al.

(10) Patent No.: US 10,853,189 B2
(45) Date of Patent: *Dec. 1, 2020

(54) IMAGE RESTORE FROM INCREMENTAL BACKUP (71) Applicant: EMC IP Holding Company LLC, Hopkinton, MA (US)

(72) Inventors: Brian J. Bishop, Redmond, WA (US); Jerzy Gruszka, Bellevue, WA (US); Matthew D. Buchman, Seattle, WA (US); Min-Chih L. Earl, Redmond, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/207,849

(22) Filed: Dec. 3, 2018

(65) Prior Publication Data
US 2019/0114231 A1 Apr. 18, 2019

Related U.S. Application Data (63) Continuation of application No. 14/230,928, filed on Mar. 31, 2014, now Pat. No. 10,146,634.

(51) Int. Cl.
G06F 16/10 (2019.01)
G06F 11/14 (2006.01)
G06F 16/11 (2019.01)
G06F 16/188 (2019.01)

(52) U.S. Cl.
CPC ........ *G06F 11/1458* (2013.01); *G06F 16/128* (2019.01); *G06F 16/188* (2019.01)

(58) Field of Classification Search
CPC .................................................... G06F 16/128
See application file for complete search history.

(56) References Cited

U.S. PATENT DOCUMENTS

| 7,694,088 | B1* | 4/2010 | Bromley | G06F 11/1458 711/162 |
|---|---|---|---|---|
| 8,352,608 | B1* | 1/2013 | Keagy | G06F 8/63 709/226 |
| 8,364,639 | B1 | 1/2013 | Koryakina | |
| 8,615,601 | B2 | 12/2013 | Patrick | |
| 8,904,125 | B1* | 12/2014 | Elling | G06F 11/1451 711/162 |
| 8,943,281 | B1 | 1/2015 | Stringham | |
| 8,983,961 | B2 | 3/2015 | Chan | |
| 9,317,547 | B1* | 4/2016 | Bachu | G06F 16/22 |
| 2002/0124150 | A1* | 9/2002 | Goodman | G06F 9/445 711/202 |
| 2003/0033344 | A1 | 2/2003 | Abbott | |
| 2006/0085784 | A1 | 4/2006 | Traut | |
| 2006/0136555 | A1 | 6/2006 | Patrick | |
| 2008/0250473 | A1 | 10/2008 | Massimiliano | |
| 2009/0055606 | A1 | 2/2009 | Gallaher | |
| 2009/0249284 | A1 | 10/2009 | Antosz | |

(Continued)

*Primary Examiner* — Mohammad S Rostami
(74) *Attorney, Agent, or Firm* — Workman Nydegger (57) ABSTRACT Systems and methods for backing up and restoring virtual machines in a cluster environment. An instrumentation interface enables configuration data to be stored with save sets during backup and enables the configuration of the destination to be adjusted based on the stored configuration during a restore.

20 Claims, 4 Drawing Sheets (56) References Cited

U.S. PATENT DOCUMENTS

| | | | |
|---|---|---|---|
| 2010/0250880 A1* | 9/2010 | Mimatsu | G06F 11/1451 |
| | | | 711/162 |
| 2010/0251234 A1 | 9/2010 | Oshins | |
| 2011/0004586 A1* | 1/2011 | Cherryholmes | G06F 11/1471 |
| | | | 707/682 |
| 2012/0084775 A1* | 4/2012 | Lotlikar | G06F 9/45558 |
| | | | 718/1 |
| 2012/0303670 A1 | 11/2012 | Gillen | |
| 2012/0324183 A1* | 12/2012 | Chiruvolu | G06F 11/2038 |
| | | | 711/162 |
| 2013/0014102 A1* | 1/2013 | Shah | G06F 9/45558 |
| | | | 718/1 |
| 2013/0067574 A1 | 3/2013 | Brueckner | |
| 2013/0117231 A1 | 5/2013 | Sridharan | |
| 2013/0219135 A1* | 8/2013 | Knowles | G06F 9/45558 |
| | | | 711/159 |
| 2013/0282653 A1 | 10/2013 | Tandra Sistla | |
| 2014/0149591 A1 | 5/2014 | Bhattacharya | |
| 2015/0106334 A1 | 4/2015 | Lee | |

\* cited by examiner

IMAGE RESTORE FROM INCREMENTAL BACKUP

CROSS-REFERENCE TO RELATED APPLICATIONS

This application is a Continuation of U.S. patent application Ser. No. 14/230,928 filed Mar. 31, 2014 and scheduled to issue on Dec. 4, 2018 as U.S. Pat. No. 10,146,634, which is incorporated by reference herein.

BACKGROUND OF THE INVENTION

1. The Field of the Invention

Embodiments of the present invention relate to backing up and restoring data. More particularly, embodiments of the invention relate to systems and methods for backing up and/or restoring virtual machines from backups including incremental backups.

2. The Relevant Technology

One of the simplest ways to protect data is to simply copy the data to a backup device. Computing systems today, however, often have very large amounts of data and the simple act of copying the data is inadequate for many reasons. First, copying the data in this manner can consume significant computing resources. Second, the original data may be unavailable for an extended period of time. As a result, more sophisticated methods for protecting data are needed.

The problems associated with protecting data are more complicated as the sophistication of the underlying computer environment increases. Clusters are an example of a sophisticated computing environment. A cluster typically includes various computing devices that work together and that can, in some examples, be viewed as a single system. Each computer or physical device in the cluster can be referred to as a node and each node can be configured to operate in various configurations. Some nodes, for example, may be configured to host one or more virtual machines.

One of the problems with cluster environments (e.g., such as may be found in datacenters) is that the ability to restore a virtual machine is complicated. Conventionally, the data protection software must be installed on the destination node of the restore operation. This is also true in the context of a restore operation that restores from incremental backup data. As the number of nodes in a computing environment gets large, the restore operation can become very cumbersome and complicated when the data protection software is required to be installed on each destination node. The restore process is further complicated when considering that the node can be configured in various ways, including as a host for one or more virtual machines.

BRIEF DESCRIPTION OF THE DRAWINGS

In order to describe the manner in which at least some of the advantages and features of the invention can be obtained, a more particular description of embodiments of the invention briefly described above will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Embodiments of the invention relate to systems and methods for protecting (e.g., backing up and/or restoring) data. Embodiments of the invention further relate to systems and/or methods for protecting virtual machines and/or data associated with virtual machines in a cluster. The data associated with virtual machines may include, but is not limited to, virtual hard disks, configuration files, differencing disks, and differencing configuration files. Embodiments further relate to systems and methods for protecting data and for backing up virtual machines in a cluster environment.

An example of a cluster is a group or collection of devices that are configured to work together and that may appear as a single system. Each computing device or each physical device may be a node of the cluster. Each node may be, by way of example only, configured to support virtual machines. The virtual machines may be configured as server computers, client devices, databases, or the like.

A node may also be configured with a virtual machine manager (VMM) or a hypervisor layer that enables one or more virtual machines to be instantiated on the node. In accordance with embodiments of the invention, some of the nodes may be configured as proxy nodes. A proxy node includes an agent that is usually running in the hypervisor layer. The agent is configured to backup and/or restore virtual machines or other data for any node in the cluster. Any node can be a proxy node and the number of proxy nodes can vary. For example, the agent can be installed on other nodes to create additional proxy nodes or removed from the proxy nodes.

In addition, the cluster may include cluster shared volumes (CSVs). While any node or any virtual machine can access the CSV, the ownership is owned by one of the nodes in the cluster. The ownership of the CSV, however, can be changed. Cluster shared volumes may allow a virtual machine to have mobility within a cluster environment in part because a CSV allows any node to access virtual hard disks (e.g., VHDs) that have been mounted on the CSVs. A CSV is an example of a cluster resource. A cluster may also include other cluster resources.

Generally, cluster resources exist on or are owned by nodes in the cluster and can migrate between nodes in the cluster. A cluster resource can be a physical resource, a software resource or the like. In addition, the cluster resource can be managed in the cluster, taken online and/or offline. Further, a cluster resource may abstract the service being provided to the cluster. As a result, the cluster may only understand that a cluster resource is available and can be used by any node in the cluster. In one example, ownership of the cluster resource belongs to the node using the cluster resource.

Embodiments of the invention relate to systems and/or methods for backing up and/or restoring virtual machines that are instantiated on nodes in the cluster and in other computing environments. Embodiments of the invention relate to restoring a virtual machine based on an incremental backup and in the context of using a proxy node. This allows a restore operation to be performed to a destination node by an agent installed on a proxy node in the cluster without having to install the agent on the destination node of the restore operation.

Embodiments of the invention may interact with a framework that may be present in or operating in the cluster. In one example, the framework can be leveraged by a data protection system. The framework may be an integral part of an operating system or of a guest operating system. The framework may provide, for example, the ability to take a snapshot of a virtual machine, an incremental snapshot of the virtual machine, generate configuration files, or the like. The framework may be incorporated as a service in a guest operating system of a virtual machine. An example of such a service or framework, by way of example, is "Hyper-V Volume Shadow Copy Service" by Microsoft®.

In addition to taking a snapshot of a virtual machine, the framework may also provide other features. When a request to perform a backup operation is received, the framework may freeze the virtual machine or applications running therein and allow the virtual machine or the applications to quiesce such that the virtual machine is in a consistent state and such that the snapshot corresponds to a quiesced state.

For example, when backing up a virtual machine, a call for backup of a virtual machine may be made by a requestor such as the agent or the backup server. The call may initiate at an agent that is operating on one of the nodes in the cluster. In one example, the node on which the agent is operating may be a proxy node that is involved in backing up a virtual machine resident on a different node. The backup of any node or of any virtual machine present on any node in the cluster can be performed from the proxy node. Thus, all virtual machines in the cluster can be backed up without having to install the agent or other application or component thereof on each of the physical nodes associated with a backup/restore operation.

Once the command for backup is issued, a snapshot of the virtual machine or of the Virtual Hard Disks (VHDs) associated with the virtual machine is taken. More generally, the framework could also take a snapshot of the CSV on which the VHD resides. A snapshot can be taken of multiple VHDs or multiple CSVs at the same time. The snapshot may be performed by the framework and access to the results of the snapshot operation may be provided to the requestor (e.g., the agent). The snapshot itself may also be a virtual hard disk (VHD).

As used herein, a virtual disk is a term that refers generally to virtual hard disks and to virtual machines and is not limited to any particular format. When backing up a virtual machine, configuration information may also be backed up in addition to the virtual hard drive on the CSV. Configuration information, by way of example, may include one or more of a description of a state of the virtual machine, a description of a location of the configuration description file for the VM, and a description of a location of the VHDs of the virtual machine. The configuration may also include a description of properties of the VM and/or the VM namespace, and/or the cluster such as, but not limited to, virtual export settings, global settings, system settings, resource allocation settings, memory settings, processor settings, cluster resource settings, and/or other settings associated with the virtual machine and/or the cluster. When the snapshot is backed up, the configuration information is a component of the save set (the set of files backed up) that is saved during a backup operation. A backup of a virtual machine may include a snapshot (or a copy of the snapshot that was generated by the framework) and a corresponding configuration file.

More generally, a backup operation results in a save set or in a component of a save set. Each virtual machine may be associated with a particular save set. The save set includes information that allows a virtual machine to be restored. In one example, the save set for a particular virtual machine allows that virtual machine to be restored to a selected point in time.

The save set associated with a virtual machine may be configured to include various components that allow the virtual machine to be restored to a selected point in time. The save set may include a copy of or a snapshot of the virtual machine. The save set may also include incremental files that represent incremental snapshots. In one example, a full incremental backup is an example of a full backup of a virtual machine. The full incremental includes an initial snapshot of a virtual machine plus additional incremental snapshots.

The data backed up during a backup operation of a virtual machine can depend on the existing save sets for that virtual machine. If no save sets exist, then a full backup operation may be performed. Subsequent requests to backup the virtual machine may result in differencing components (e.g., differencing disks and differencing configuration files). As some point in time, another full backup may be performed instead of an incremental backup.

After a snapshot is taken, the results of the snapshot are reported to the requestor or the backup application (e.g., the agent). The components identified in the results, which may be differencing components, are backed up. They may be added to a save set for example. These snapshots can be chained together.

In addition, the framework may also generate a backup component document that can be included in the backup or stored separately. The backup component document can be interpreted to identify the original names of the components that were backed up during a corresponding backup operation. The backup component document may include, for example, the original names of differencing disks and configuration files. This information may be used during a restore operation such that a virtual machine can be restored. More particularly, this information may allow a virtual machine to be restored to a node via an agent running on a proxy node.

Figure 1:
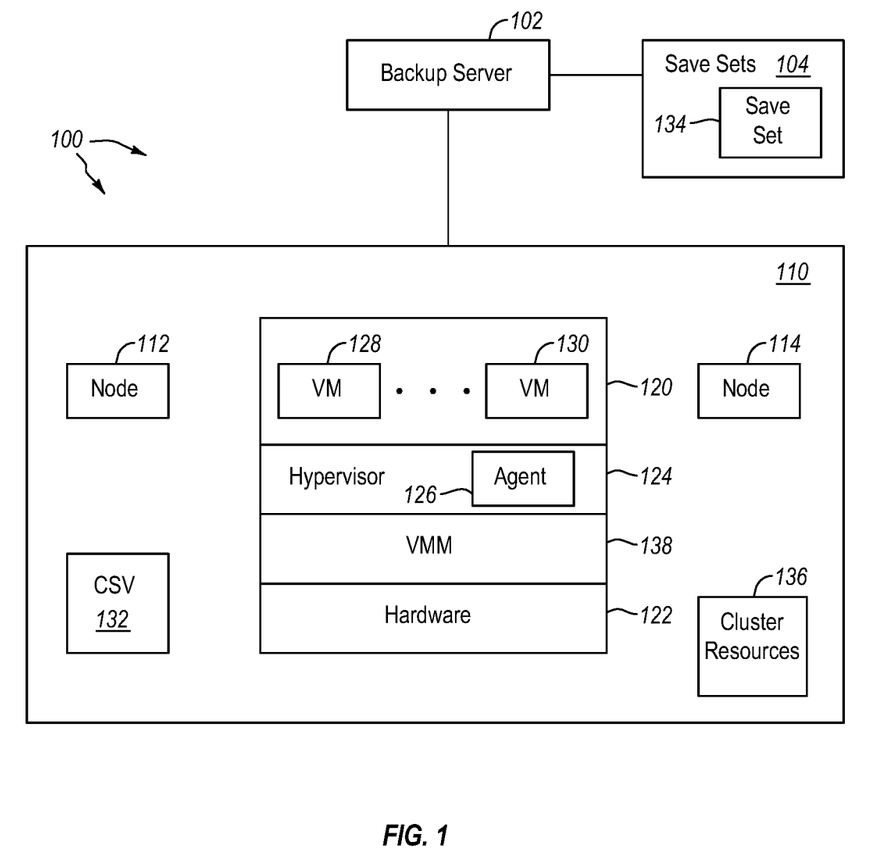
FIG. 1 illustrates an example of a data protection system capable of performing backup operations and restore operations for data in a computing environment.

FIG. 1 illustrates an example of a cluster in a computer system 100. The computer system 100 illustrated in FIG. 1 may include one or more networks or network configurations. A cluster 110 in the computer system 100 may include storage configured to store data of varying types of data (e.g., virtual machines, snapshots, applications, email, video, image, text, database, user data, documents, spreadsheets, or the like or any combination thereof). In the cluster 110, the data, applications, virtual machines, or the like or a portion thereof can be backed up and restored in cooperation with a backup server 102. The backup of the data may be continuous, periodically, on a requested or scheduled basis.

Although various types of data can be backed up, the following description discusses backing up and/or restoring virtual machines. When performing a backup operation, the backup server 102 generates save sets 104. The save sets 104 correspond, in one example, to backups of the virtual machines in the cluster 110 or other data. The save sets 104 may include full backups, incremental backups, full incremental backups, or the like.

More specifically, the cluster 110 includes one or more nodes, illustrated as node 112, node 114 and node 120 in this example. Each node includes or may be associated with hardware or with a physical device. The node 120 is associated with hardware 122. The hardware 122 can include processors, network adapters, memory of various types, caches, and other chips that may be used in enabling the operation of the hardware 122. The hardware 122 may constitute one or more physical devices. Some of the nodes in the cluster may be using the same physical hardware. Alternatively, or in addition, some of the nodes may be associated with separate hardware.

In the cluster 110, the nodes 112, 114, and 120 may each be associated with different hardware (e.g., each node may be a distinct or separate computing device). Alternatively, the nodes 112, 114, and 120 may be configured such that the hardware is shared or such that certain hardware, such as a hard disk drive, is shared. The nodes 112, 114, and 120 or the virtual machines instantiated thereon may utilize the same storage, processor group, network adapter, or the like or any combination thereof.

The hardware 122 of the cluster 110 may include one or more cluster shared volumes (CSV). The CSV 132 is an example of a cluster shared volume. The CSV 132 is a volume configured such that more than one virtual machine (discussed below) can use the same physical disk even if the disk is not on the same node. In addition, the virtual machines that may be using the CSV 132 can move to different nodes (e.g., during failover or for another reason) independently of each other. In one example, the various virtual machines operating in the cluster 110 can move from or transfer one node to another node for different reasons.

FIG. 1 further illustrates that a virtual machine manager (VMM) 138 and/or a hypervisor 124 are installed on or are operating on the node 120. The hypervisor 124 and the VMM 138 are typically software that cooperate to create and manage virtual machines on a host machine or on host hardware such as the hardware 122 of the node 120. Each of the nodes 112 and 114 may also include a hypervisor 124 and/or a VMM 138. The hypervisor 124 operates to abstract the hardware 122 in order to instantiate virtual machines.

In FIG. 1, the node 120 supports virtual machines represented as virtual machine 128 and virtual machine 130. The virtual machines 128 and 130 may be associated as parent and child in one example. Each virtual machine 128 and 130 may include or be associated with one or more virtual hard disk (VHDs). Although reference is made to VHDs, one of skill in the art can appreciate that many formats may be used. A virtual hard disk may be, in one example, a file that is configured to be used as a disk drive for a virtual machine or that is a representation of a virtual machine. In one example, the virtual machines 128 and/or 130 can be encapsulated in a file or in a file structure. The virtual hard disk of the virtual machine 128 and the virtual hard disk of the virtual machine 130 may both reside on the CSV 132.

FIG. 1 further illustrates the backup server 102. The backup server 102 may communicate with the cluster 110. In particular, the agent 126 may cooperate with the backup server 102 to perform backup/restore operations for virtual machines present in the cluster 110. The backup server 102 is configured to generate save sets 104. The save sets 104 in general correspond to backups of the virtual machines in the cluster 110. Each save set in the save sets 104 may be a backup of one or more of the virtual machines operating in the cluster 110.

In this example, a save set 134 may be a backup of the virtual machine 128. Other save sets in the save sets 104 may correspond to backups of the virtual machine 128 or of other virtual machines. The save sets may be configured such that the virtual machine (e.g., the virtual machines 128 and 130) can be restored at any point in a given time period. Embodiments of the invention also enable the save set 134 to be restored at a location or node that may be different from the location or node from which the backup was performed. For example, a backup of the virtual machine 128 may be restored to the node 112, to another node in the cluster, to another cluster, or to a stand-alone machine.

A backup of the virtual machine 128 (or portion thereof) or of the virtual machines in the cluster 110 can be initiated in various ways (e.g., periodically, on request, or the like). The backup server 102 can coordinate with a local agent 126 when performing a backup or a restore of a virtual machine on the node on which the local agent 126 resides. Any virtual machine running on nodes in the cluster 110 can be backed up or restored by the local agent 126. The local agent 126 and the virtual machines being backed up or restored do not need to reside on the same physical node.

The local agent 126 may be one of the cluster resources 136. The local agent 126 can coordinate a backup or restore of a virtual machine on the node on which the local agent resides. The local agent 126 may be operating on a proxy node such that the local agent can also perform a backup or restore operation for another node. Further, the local agent 126 can operate on any of the nodes in the cluster 110. Alternatively, each node in the cluster 110 may be associated with a local agent.

In one example, the agent 126, in cooperation with the backup server, may perform the backup of a virtual machine in a manner that preserves configuration information about the virtual machine and/or of the cluster 110. By preserving or by incorporating the configuration information into the save set 134 (e.g., as metadata or an xml file), a redirected restore (e.g., restoring a previously backed up virtual machine to another location in the cluster 110 or to another location in a different cluster or to a different location) can be performed in a manner that avoids problems associated with different disk structures, different directory structures, access control lists (ACLs), or the like.

Figure 2:
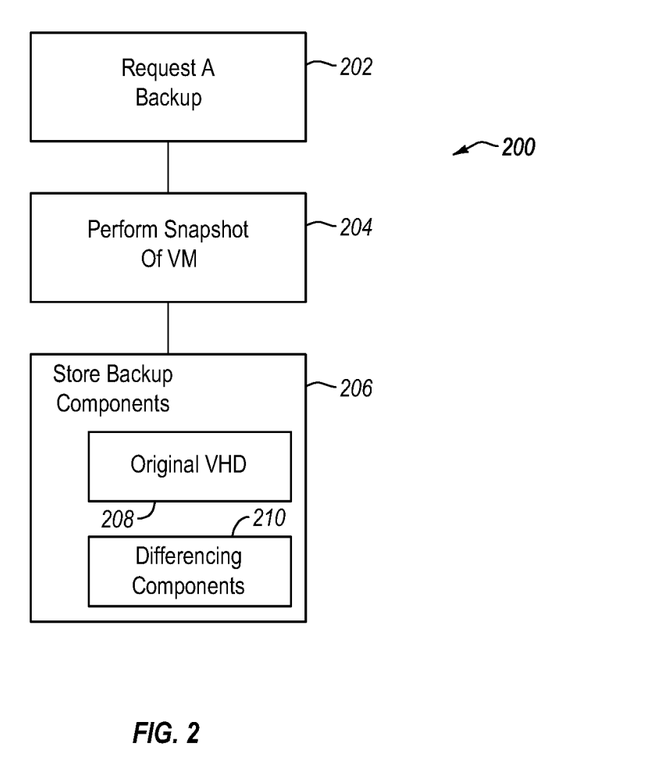
FIG. 2 illustrates an example of a backup operation for a virtual machine.

FIG. 2 illustrates an example of a backup operation 200 for a virtual machine (VM). In box 202, a backup is requested. The backup can be requested by a requestor (e.g., the backup server, an agent instantiated on a proxy node). The backup request may be directed to a framework or service of an operating system. For example, the backup request may be directed to a framework or service of an operating system on the node on which the virtual machine being backed up resides. After the backup request has been received, a snapshot of a VM is performed in box 204. The snapshot may include a snapshot of a VHD residing on a CSV in the cluster.

The snapshot of the VM may be performed by the framework or service of the operating system. The results are reported back to the requestor and the backup components are identified or reported to the requestor. In box 206, the backup components are stored. In one example, the backup components are stored as a save set. The save set may include a copy (e.g., the snapshot or copy thereof) of an original VHD 208 and differencing components 210.

Figure 3:
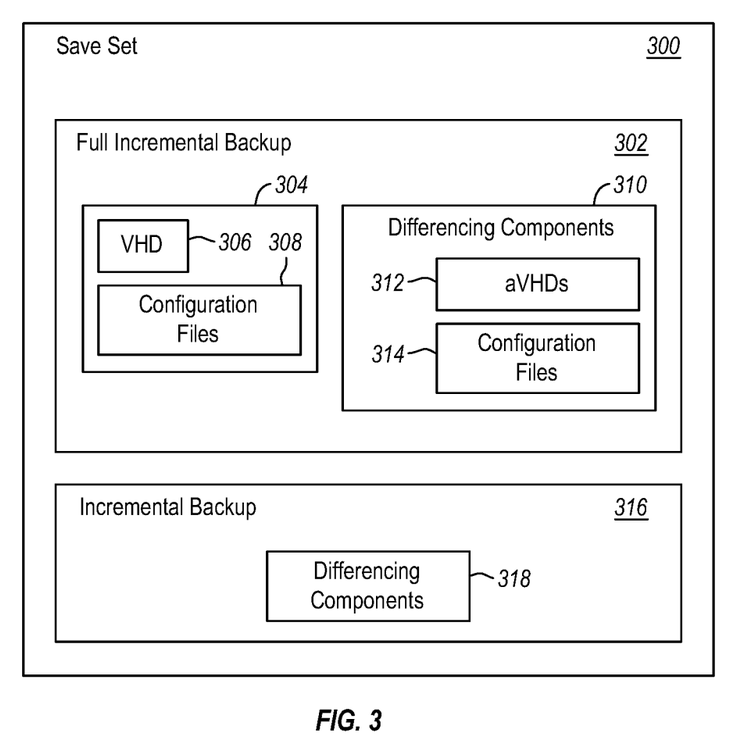
FIG. 3 illustrates an example of a save set that includes a full-incremental backup and additional incremental backups.

FIG. 3 illustrates another example of a save set 300. The save set 300 includes a full incremental backup 302 that includes base components 304. The base components 304 includes a virtual hard disk (VHD) 306 and configuration files 308 associated with the VHD 306 and other information necessary to restore a virtual machine. The base components 304 may correspond to a point in time where an initial backup operation was performed. Alternatively, the base components 304 may correspond to a later point in time. The full incremental backup 302 may also include differencing components such as aVHDs 312 and differencing configuration files 314. Together, the initial backup 304 and the differencing VHDs 310 are an example of a full incremental backup 302. The full incremental backup 302 allows the virtual machine to be restored to points in time corresponding to the full incremental backup 302.

Subsequent backup requests may result in an incremental backup 316. The incremental backup 316 includes differencing components 318, such as the aVHDs 312 and the differencing configuration files 314. The save set 300 may include multiple incremental backups 316. The incremental backup 316 can be chained together with the full incremental backup 302. When a backup is completed, the framework may merge the differencing components to the base components 304 if desired. When a virtual machine is restored at least some of the incremental components are merged into the base components.

As illustrated in FIG. 3, the backup components may include base components (which may include both virtual disk files and configuration files) and differencing components (which may also include differencing disk files such as differencing snapshots and differencing configuration files).

Figure 4:
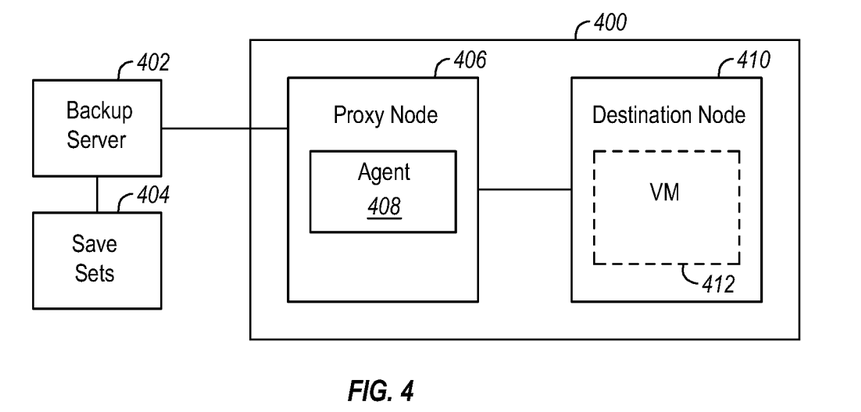
FIG. 4 illustrates an example of a restore operation to a destination node using a proxy node.

FIG. 4 illustrates a system in which a virtual machine is restored from a proxy node in a cluster. The cluster 400 includes multiple nodes, which are illustrated as a node 406 and a node 410. In this example, the node 406 operates as a proxy node and the proxy node 406 includes an agent, which is an example of a local component that may be installed on any node. The agent may be a plugin, for example. The agent 408 can coordinate a restore operation such that a save set from the save sets 404 is restored and instantiated as a virtual machine 412 on a destination node 410.

During the restore operation, the plugin 408 may restore an entire backup chain or a partial backup chain. The point (e.g., date, time) to which the VM 412 is restored may be selected by a user. For example, a user may select a particular backup point and the VM 412 is restored to that point based on the corresponding save set.

The backup operation may begin by restoring the full incremental backup (e.g., the backup 302) and then restoring the subsequent incremental backups (e.g., the incremental backup 316). These backups are eventually restored to a target location. During the restore operation, the various components of the virtual machine may be retrieved by the backup server 402 and provided to the agent 408.

At this point, the virtual machine 408 may be in a planned state or in a need to restore state and may not be fully instantiated on the node 410. The components of the virtual machine 412 are processed in preparation for becoming an operating virtual machine in the cluster. For example, the configuration of the virtual machine 412 may be further revised by renaming the incremental backup components to their original names. This may occur prior to merging the incremental components into the base components. In particular, the differencing disks (aVHDs) and the corresponding configuration files are renamed. The original names can be derived from a backup component document that was generated by the framework or service that generated the snapshots.

After the incremental backup components have been renamed, the incremental backup components are imported into a planned system based on the definition of the virtual machine being restored.

Figure 5:
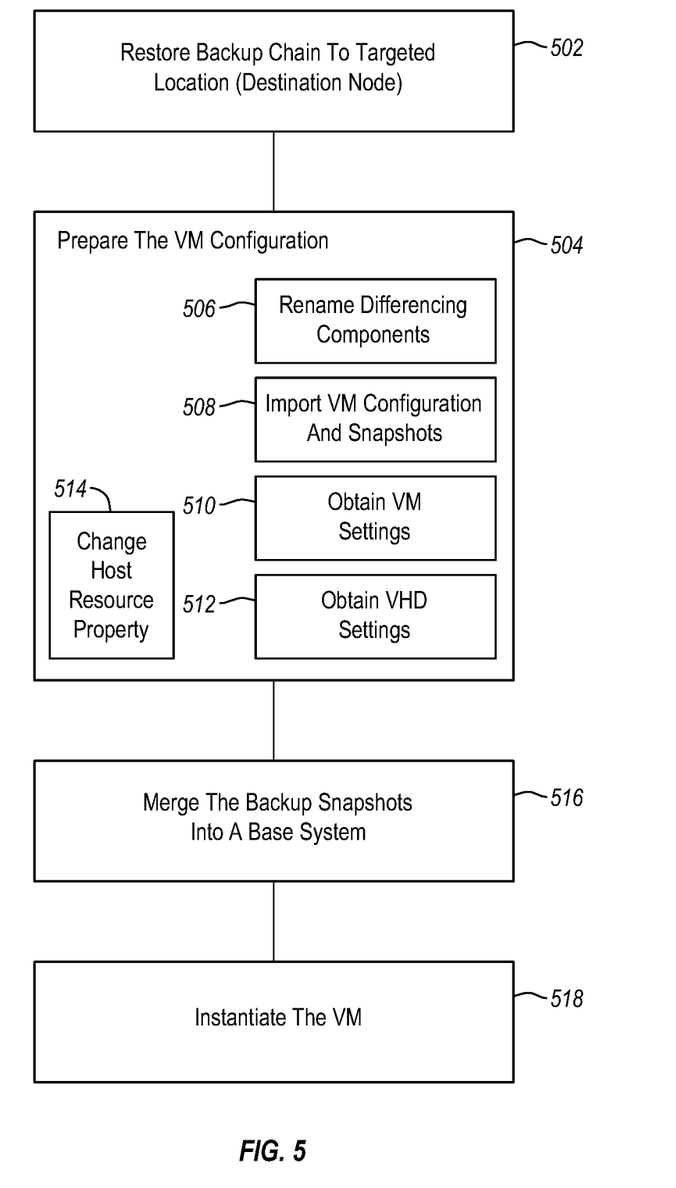
FIG. 5 illustrates an example of a method for restoring a virtual machine.

FIG. 5 illustrates an example of a method for restoring a virtual machine to a node. Generally, the agent first restores the backup chain starting with a full backup and all subsequent incremental backups to a location. The agent then processes or revises the components such that the components are configured. This may include renaming various components such as differencing disks or configuration files. These files are renamed in one example to fix path names such that the path names point to the original VHD locations. The instrumentation can be used to identify the names and various names can be changed or the paths can be properly set such that the virtual machine is operating properly in the cluster.

The instrumentation may include various methods that can be used in the context of restoring a virtual machine.

In one example, the cluster or operating system may include a management instrumentation that provides an infrastructure for managing data and operations. Web-Based Enterprise Management (WBEM) (which is incorporated by reference in its entirety) is an example of an infrastructure for accessing management information in an enterprise environment. WMI (Windows Management Instrumentation) is an example implementation of WBEM. The infrastructure may be used to import snapshot definitions, import virtual system definitions, modify feature settings, modify resource settings, modify virtual disk settings, or the like. The infrastructure may provide methods that allow the components of a virtual machine retrieved from the save sets to be realized as an active running virtual machine. Embodiments of the invention can restore a virtual machine without relying on a framework that generated the snapshots during the backup operation.

As discussed herein, the virtual machine can be restored from a proxy node. Initially, a backup chain is restored to a location (e.g., the destination node) in box 502. However, the backup chain may be initially restored to another location and later be migrated to the destination node. The agent may cooperate with the backup server to restore the whole backup chain or save set. The restore operation may begin by restoring a full incremental backup and then restoring subsequent incremental backups. The restore operation may use input to determine where the restore operation stops or to determine the state to which the virtual machine is restored. For example, the restore operation may not restore all available incremental backups, but may only restore up to a certain point or up to a selected incremental backup.

In box 504, the plugin prepares the VM configuration or fixes up the "need to restore" configuration. This may include making various calls to the instrumentation infrastructure (e.g., WMI or WBEM). This may include removing any version of the virtual machine that may still exist in the cluster, getting a summary of the virtual machine, importing snapshot definitions, importing system definitions, modifying path names, modifying disk settings, renaming components, modifying resource settings, or the like.

The following discussion illustrates examples of fixing of a planned VM. Fixing the planned VM can include preparing the VM configuration, for example by renaming the differencing components in box 506. As previously stated, the differencing components (e.g., the differencing aVHDs and differencing configuration files) may have been renamed during the backup operation. These components are renamed based on a backup component document that was produced by the framework. This may ensure that the path names to the VHD and other components are appropriately set.

In box 508, the VM configuration and differencing VM snapshots are imported. In box 508, the virtual machine is planned based on a specified virtual machine definition. This can include identifying a path to the system definition file that represents the virtual machine. It may also include identifying the path to the folder or location that stores the snapshot configurations for the virtual machine.

In box 510, the VM settings are obtained. This may include obtaining a VM management object for the VM to be imported. The settings may relate to the virtual machine name, the configuration file, the guest operating system, a directory or path where snapshot files are stored, and other settings. From the Virtual Machine settings, the VHD settings can be obtained in box 512.

In box 514, a resource property of the host (e.g., the destination node) may be changed to the path for the VHD and the aVHDs.

In box 516, the backup snapshots are merged into a base system. In one example, this process begins with a full-incremental save set (the base system). The incremental backups (e.g., the aVHDs) are then merged into the base system. Because these files have been renamed, they point to a targeted directory. The relationships between than can be identified (e.g., parent/child) and the snapshots can be imported. This may result in the VHD file of the virtual machine, which has been generated by combining the backup chain.

In box 518, the VM is instantiated by moving a planned VM to a realized VM. In one example, the planned VM is converted into a realized VM. If necessary, the realized VM can be migrated to the destination node.

In one example of a restore operation, an agent restores an entire backup chain starting with a full backup (e.g., a full incremental backup) and all subsequent incremental backups up to and including a selected backup. The backup chain is restored to a targeted location and is an example of a planned virtual machine or of a to be restored virtual machine.

The agent then fixes the configuration of the planned virtual machine. The agent may rename some of the incremental components such as the incremental backups back to their original names, which may be obtained or derived from a backup component document that is generated by a framework that generated the snapshots backed up in the components. Using an infrastructure (e.g., WBEM or implementation thereof) of the system, the planned virtual machine is imported. This can include importing the virtual machine configuration and the differencing snapshots. The management object may then be obtained from the imported virtual machine. The management object typically contains setting related to the virtual machine and to the virtual hard disk associated with the virtual machine. This allows the settings of the planned virtual machine to be applied. The settings may include a path name for the virtual hard drive and for aVHDs.

For each save set or for the components that have been restored, the snapshots are merged together. Because the backup snapshots have been renamed and because the VHDs and the aVHDs all point to the targeted directory, the merge operation and discover relationships between the snapshots (e.g., parent/child) and import all of the snapshots successfully. At this point, the planned virtual machine can be converted to a real virtual machine in the cluster.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for restoring a virtual machine in a cluster computing environment that includes a plurality of nodes including a proxy node, the method comprising:
    performing a redirected restore of a backup chain associated with a virtual machine to a destination node that is different from a node from which the backup chain was generated, wherein the backup chain is generated by a framework, by restoring the entire backup chain to a targeted location at the destination node to generate a virtual machine configuration that needs to be restored, wherein the backup chain includes a full backup and all subsequent incremental backups up to and including a selected incremental backup;
    fixing the virtual machine configuration of the virtual machine that needs to be restored at least by:
        renaming differencing components including, differencing disks and differencing configuration files back to their original names such that all point to the targeted location, where the differencing components are included in the backup chain and relate to the subsequent incremental backups;
        obtaining setting for the virtual machine by importing a virtual machine management object that stored the settings, where the settings include virtual hard disk settings, wherein the virtual machine management object is obtained from the imported virtual machine; and
        setting a resource property of the destination node to the path of the targeted directory for the virtual hard disks;
    starting with the full backup, merging the full backup and all subsequent increment backups into a base system to convert the fixed virtual machine configuration that needs to be restored into a planned virtual machine;
    moving the planned virtual machine to a realized virtaul machine, using an instrument interface, at the destination node without relying on a framework that generated the backup chain, wherein the original names identify relationships between the full backup and all subsequent incremental backups while instantiating the planned virtual machine to the realized virtual machine.

2. The method of claim 1, further comprising retrieving a save set from a storage device, the save set including the backup chain.

3. The method of claim 1, wherein fixing the virtual machine configuration includes:
    preparing the virtual machine configuration based on the components associated with the virtual machine and included in the backup chain by:
        importing snapshots, differencing snapshots, configuration files and differencing configuration files; and
        removing any version of the virtual machine that exists in the cluster computing environment.

4. The method of claim 3, wherein fixing the virtual machine configuration includes preparing a planned virtual machine from the components, wherein the components include the snapshots, the differencing snapshots, the configuration files, and the differencing configuration files.

5. The method of claim 4, wherein preparing a planned virtual machine includes renaming at least some of the components of the virtual machine such that a virtual hard drive points to a targeted directory.

6. The method of claim 4, further comprising applying the settings to the virtual machine.

7. The method of claim 4, further comprising applying the settings of the virtual hard drive.

8. The method of claim 6, further comprising converting the planned virtual machine to a realized virtual machine.

9. The method of claim 1, wherein the virtual machine is restored to a destination node in the computing environment by an agent residing on a proxy node that is different from the destination node.

10. The method of claim 1, wherein the restore is a redirected restore to a destination node that is different from a node from which the backup chain was generated.

11. A non-transitory computer readable medium including computer executable instructions that, when executed, perform a method for restoring a virtual machine in a cluster computing environment that includes a plurality of nodes including a proxy node, the method comprising:
    performing a redirected restore of a backup chain associated with a virtual machine to a destination node that is different from a node from which the backup chain was generated, wherein the backup chain is generated by a framework, by restoring the entire backup chain to a targeted location at the destination node to generate a virtual machine configuration that needs to be restored, wherein the backup chain includes a full backup and all subsequent incremental backups up to and including a selected incremental backup;
    fixing the virtual machine configuration of the virtual machine that needs to be restored at least by:
        renaming differencing components includig differencing disks and differencing configuration files back to their original names such that all point to the targeted location, wherein the differencing components are included in the backup chain and relate to the subsequent incremental backups;
        obtaining settings for the virtual machine by importing a virtual machine management object that stored the setting, wherein the settings including virtual hard disk settings, wherein the virtual machine management object is obtained from the imported virtual machine; and
        setting a resource property of the destination node to the path of the targeted directory for the virtual hard disks;
    starting with the full backup, merging the full backup and all subsequent incremental backups into a bae system to convert the fixed virtual machine configuration that needs to be restored into a planned virtual machine;
    moving the planned virtual machine to a realized virtual machine, using an instrumental node without relying on a framework that generated the backup chain, wherein the original names identify relationships between the full backup and all subsequent incremental backups while instantiating the planned virtual machine to the realized virtual machine.

12. The non-transitory computer readable medium of claim 11, further comprising retrieving a save set from a storage device, the save set including the backup chain.

13. The non-transitory computer readable medium of claim 11, wherein fixing the virtual machine configuration includes:
preparing the virtual machine configuration based on the components associated with the virtual machine and included in the backup chain by:
importing snapshots, differencing snapshots, configuration files and differencing configuration files; and
removing any version of the virtual machine that exists in the cluster computing environment.

14. The non-transitory computer readable medium of claim 13, wherein fixing the virtual machine configuration includes preparing a planned virtual machine from the components, wherein the components include the snapshots, the differencing snapshots, the configuration files, and the differencing configuration files.

15. The non-transitory computer readable medium of claim 14, wherein preparing a planned virtual machine includes renaming at least some of the components of the virtual machine such that a virtual hard drive points to a targeted directory.

16. The non-transitory computer readable medium of claim 14, further comprising applying the settings to the virtual machine.

17. The non-transitory computer readable medium of claim 14, further comprising applying the settings of the virtual hard drive.

18. The non-transitory computer readable medium of claim 17, further comprising converting the planned virtual machine to a realized virtual machine.

19. The non-transitory computer readable medium of claim 11, wherein the virtual machine is restored to a destination node in the computing environment by an agent residing on a proxy node that is different from the destination node.

20. The non-transitory computer readable medium of claim 11, wherein the restore is a redirected restore to a destination node that is different from a node from which the backup chain was generated.

* * * * *